(12) United States Patent
Dore et al.

(10) Patent No.: US 9,949,206 B2
(45) Date of Patent: Apr. 17, 2018

(54) METHOD FOR CONFIGURATION OF A WIRELESS NETWORK

(71) Applicant: THOMSON LICENSING, Issy de Moulineaux (FR)

(72) Inventors: Renaud Dore, Rennes (FR); Francois Baron, Thorigne-Fouillard (FR); Philippe Chambelin, Chateaugiron (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/403,174

(22) PCT Filed: May 23, 2013

(86) PCT No.: PCT/EP2013/060681
§ 371 (c)(1),
(2) Date: Nov. 22, 2014

(87) PCT Pub. No.: WO2013/174953
PCT Pub. Date: Nov. 28, 2013

(65) Prior Publication Data
US 2015/0098378 A1    Apr. 9, 2015

(30) Foreign Application Priority Data
May 24, 2012 (FR) ..................... 12 54791

(51) Int. Cl.
*G08C 17/00* (2006.01)
*H04W 52/02* (2009.01)
(Continued)

(52) U.S. Cl.
CPC ....... *H04W 52/0206* (2013.01); *H04W 24/02* (2013.01); *H04W 84/045* (2013.01); *Y02B 60/50* (2013.01)

(58) Field of Classification Search
CPC  H04W 52/0206; H04W 24/02; H04W 84/045
(Continued)

(56) References Cited

U.S. PATENT DOCUMENTS 5,805,995 A * 9/1998 Jiang ..................... H04W 36/30
455/436
7,483,700 B2  1/2009 Buchwald et al.
(Continued)

FOREIGN PATENT DOCUMENTS

| | | |
|---|---|---|
| CN | 1778124 | 5/2006 |
| CN | 101018082 | 8/2007 |

(Continued)

OTHER PUBLICATIONS

Search Report dated Jun. 6, 2013.
(Continued)

*Primary Examiner* — Chi H Pham
*Assistant Examiner* — Alexander O Boakye
(74) *Attorney, Agent, or Firm* — Brian J. Dorini; Joseph J. Opalach

(57) ABSTRACT

A configuration method of a first access point of a network is disclosed, which comprises a configuration of the first access point as belonging to a low power set and able to transmit at a power level lower than a first value on at least one low power channel; a transmission of an indication that the first access point belongs to the low power set and a selection of a low power channel for transmission among at least one low power channel on which the reception power of a signal transmitted by the neighboring access points is less than a second power level.

19 Claims, 6 Drawing Sheets

Figure 1:
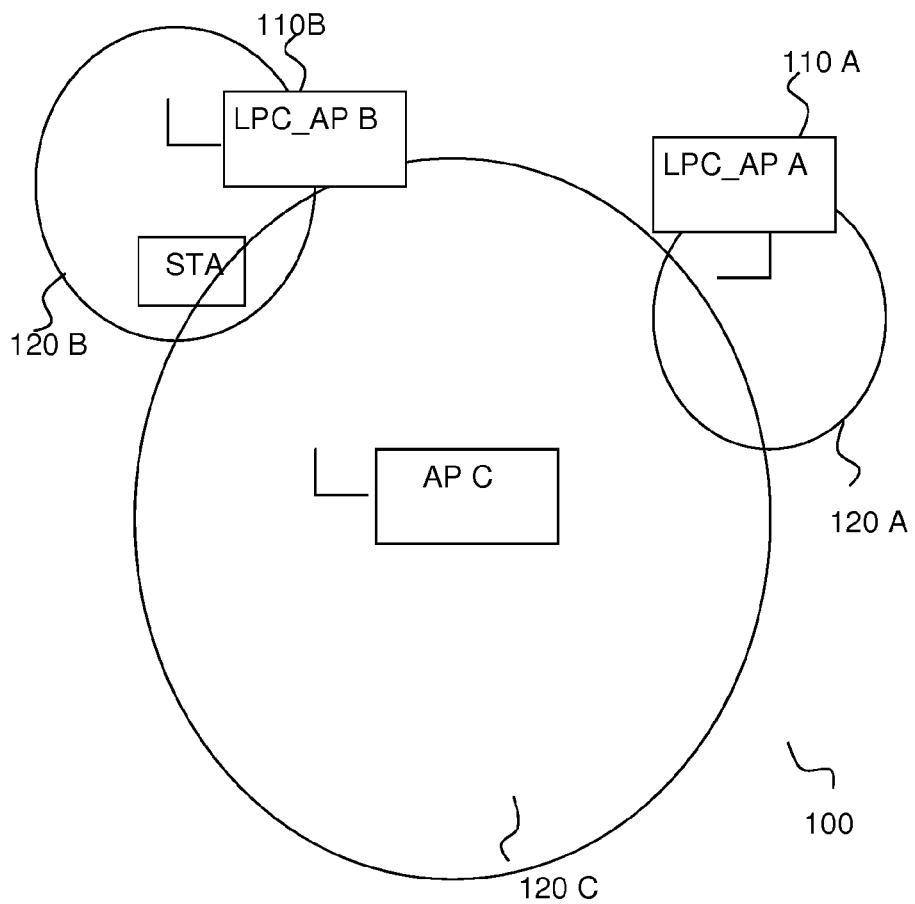

(51) Int. Cl.
*H04W 24/02* (2009.01)
*H04W 84/04* (2009.01)

(58) Field of Classification Search
USPC ....... 370/311, 328, 329, 235–238, 338, 389;
455/436, 439, 522, 450, 63.1, 69, 452.1,
455/455
See application file for complete search history.

(56) References Cited

U.S. PATENT DOCUMENTS

| | | | |
|---|---|---|---|
| 7,565,149 B2 * | 7/2009 | Saffre | H04W 52/48 370/329 |
| 7,809,012 B2 | 10/2010 | Ruuska et al. | |
| 2006/0009231 A1 | 1/2006 | Emami et al. | |
| 2008/0317098 A1 | 12/2008 | Juntunen | |
| 2009/0316649 A1 | 12/2009 | Chen | |
| 2010/0002603 A1 | 1/2010 | Gupta et al. | |
| 2010/0111022 A1 | 5/2010 | Chang et al. | |
| 2011/0045835 A1 | 2/2011 | Chou et al. | |
| 2011/0269406 A1 | 11/2011 | Aminaka et al. | |
| 2012/0157096 A1 | 6/2012 | Baek et al. | |

FOREIGN PATENT DOCUMENTS

| | | |
|---|---|---|
| EP | 2302979 | 3/2011 |
| JP | 2008205748 | 4/2008 |
| JP | 2010034756 | 2/2010 |
| JP | 2011082973 | 4/2011 |
| JP | 2011525329 | 9/2011 |
| JP | 2011527162 | 10/2011 |
| WO | WO2010079560 | 7/2010 |
| WO | WO2011003008 | 1/2011 |
| WO | WO2011107292 | 9/2011 |

OTHER PUBLICATIONS

Anonymous, IEEE Standard 802.11-2012, IEEE Standard for Information Technology—Telecommunications and Information Exchange between systems—Local and Metropolitan Area Networks—Specific Requirements, "Part 11: Wireless LAN Medium Access Control (MAC) and Physical Layer (PHY) Specifications", IEEE Computer Society, New York, Mar. 29, 2012, pp. 1-2793.

Anonymous, IEEE Standard 802.11-2007, IEEE Standard for Information Technology—Telecommunications and Information Exchange between systems—Local and Metropolitan Area Networks—Specific Requirements, "Part 11: Wireless LAN Medium Access Control (MAC) and Physical Layer (PHY) Specifications", IEEE Computer Society, New York, Jun. 12, 2007, pp. 1-1232.

Anonymous, IEEE Standard 802.11b-1999 (R2003), Supplement to IEEE Standard for Information Technology—Telecommunications and Information Exchange between systems—Local and Metropolitan Area Networks—Specific Requirements, "Part 11: Wireless LAN Medium Access Control (MAC) and Physical Layer (PHY) specifications: Higher-Speed Physical Layer Extension in the 2.4 GHz Band", IEEE Computer Society, New York, Jun. 12, 2003, pp. 1-96.

Anonymous, IEEE Standard 802.11g-2003, IEEE Standard for Information Technology—Telecommunications and Information Exchange between systems—Local and Metropolitan Area Networks—Specific Requirements, "Part 11: Wireless LAN Medium Access Control (MAC) and Physical Layer (PHY) specifications, Amendment 4: Further Higher Data Rate Extension in the 2.4 GHz Band", IEEE Computer Society, New York, Jun. 27, 2003, pp. 1-78.

Anonymous, IEEE Standard 802.15.1-2002, IEEE Standard for Information Technology—Telecommunications and Information Exchange between systems—Local and Metropolitan Area Networks—Specific Requirements, "Part 15.1: Clause 5, Wireless Medium Access Control (MAC) and Physical Layer (PHY) Specifications for Wireless Personal Area Networks (WPANS)", IEEE Computer Society, New York, Jun. 14, 2002, pp. 1-5.

Anonymous, IEEE Standard 802.16-2004, IEEE Standard for Local and Metropolitan Area Networks, "Part 16: Air Interface for Fixed Broadband Wireless Access Systems", IEEE Computer Society, New York, Oct. 1, 2004, pp. 1-893.

Hu et al., IEEE Standard 802.22 Wireless RANs, "IEEE 802.22 Wireless RAN Standard PHY and MAC Proposal", IEEE Computer Society, New York, Jan. 2006, pp. 1-60.

\* cited by examiner

METHOD FOR CONFIGURATION OF A WIRELESS NETWORK

This application claims the benefit, under 35 U.S.C. § 365 of International Application PCT/EP2013/060681, filed May 23, 2013, which was published in accordance with PCT Article 21(2) on Nov. 28, 2013 in English and which claims the benefit of French patent application No. 1254791 filed May 24, 2012.

1. SCOPE OF THE INVENTION

The invention relates to the domain of telecommunications and more specifically to the configuration of the power and frequencies in a wireless network.

2. PRIOR ART

According to the prior art, several architectures of WLAN (Wireless Local Area Network) networks are known. Some of them use a single access point to cover a space such as a house or the landing of a building by the use, for example, of a high transmission power combined with different sophisticated technologies such as MIMO (Multiple Input Multiple Output) or OFDM (Orthogonal Frequency Division Multiplexing). Hence, an access point of a Wi-Fi® network (based on the standard 802.11n) reaches a real bitrate of 100 Mbit/s within a radius of 90 metres by means of the MIMO and OFDM technologies. Such architectures based on a single access point present the disadvantage of producing a high level of interferences with respect to the neighbouring area and the risk of not covering the entire space to be covered, particularly in some zones separated from the access point by physical obstacles, such as walls causing strong attenuations of the signal transmitted. Moreover, the use of a heightened transmission power raises questions of public health relating to the risks linked to prolonged exposure to electromagnetic radiation.

Other wireless local network architectures use several access points, with a weaker transmission power than in the single access point architectures, spread within the space to be covered and connected together for example by a wired backbone. Such architectures are however complicated to configure. In fact it is difficult to correctly configure the parameters of each of the access points (for example the frequency channel and the transmission power) to ensure a total coverage of the space to be covered with a minimum of interferences. If the level of the transmission power is too weak, some zones of the space risk not being covered and if the transmission power is too strong, the interferences between the different access points risk being too high.

3. SUMMARY OF THE INVENTION

The purpose of the invention is to overcome at least one of these disadvantages of the prior art.

More specifically, the purpose of the invention is notably to optimise the configuration of a wireless network comprising at least one access point.

The invention relates to a configuration method of a first access point of a network. The method comprises a configuration step of the first access point as belonging to a low power set comprising at least one access point able to transmit at low power on at least one low power channel; a transmission step of an element of information representative of the membership of the first access point to the low power set.

According to a particular characteristic, the configuration step comprises a determination of a first threshold according to which a signal power transmitted by said first access point on a low power channel is less than a first threshold.

According to another particular characteristic, the method comprises a selection step of a low power channel by the first access point, the selection being dependent on the reception power of a signal transmitted by the neighbouring access points on a channel of a set of at least one channel.

Advantageously, during the selection step of a low power channel, a low power channel is selected from the at least one low power channel on which the reception power of a signal transmitted by the neighbouring access points is less than a second threshold.

Advantageously, during the selection step of a low power channel, no low power channel is selected when the reception power of a signal transmitted by the neighbouring access points on each of the at least one low power channel is greater than said second threshold.

According to another characteristic, during a selection step of a low power channel, a low power channel is further selected among the at least one low power channel on which the number of neighbouring access points is the greatest.

Advantageously, a low power channel is selected from the at least one low power channel on which the number of neighbouring access points is less than a third threshold.

Advantageously, during the selection step of a low power channel, no low power channel is selected when the number of neighbouring access points on each of the at least one low power channel is greater than said third threshold.

According to another characteristic, during the selection step of a low power channel, a low power channel is further selected among the at least one low power channel on which the received power of the neighbouring access points is the lowest.

Advantageously, during the selection step of a low power channel, the low power channel is selected randomly when no low power channel is used by a neighbouring access point.

According to a particular characteristic, said reception power of a signal transmitted by the neighbouring access points on a channel is chosen from:
  the reception power by the first access point of any signal transmitted by each of said neighbouring access points on said channel,
  the average reception power by the first access point of any signal transmitted by each of said neighbouring access points on said channel over a determined period,
  the reception power by the first access point of any signal transmitted by each of said neighbouring access points on said channel with the exception of signals comprising the beacon frames of each of the neighbouring access points.

According to a specific characteristic, the emission step by the first access point of the information representative of the membership of the at least one access point to the low power set, comprises the emission of beacon frames, the beacon frames comprising the information representative of the membership to the low power set.

Advantageously, the beacon frames are transmitted at a greater level of power than the first threshold.

Advantageously, the beacon frames comprise an element of information representative of a level of power of the beacon frame. This characteristic is particularly well adapted to the estimation of a level of reception power of the data signals when the beacon frames are transmitted at a level greater than the first threshold.

According to another aspect, the invention relates to a device implementing the methods according to one of the variants previously described. The invention relates to a first access point of a network. The first access point comprises a configuration module adapted to an element of information representative of the membership of the first access point to a low power set comprising at least one access point able to transmit at low power on at least one low power channel; and a interface adapted to transmit of said element of information representative of the membership of the first access point to the low power set.

According to a particular characteristic, the configuration module is adapted to determine of a first threshold according to which a signal power transmitted by said first access point on a low power channel is less than a first threshold.

According to another particular characteristic, the configuration module is adapted to select a low power channel, the selection being dependent on the reception power by the interface of a signal transmitted by the neighbouring access points on a channel of a set of at least one channel.

According to another aspect, the invention relates to a configuration method of a network. The method comprises the following steps implemented in at least one configuration device:
- a reservation step of a frequency space comprising at least one low power channel,
- a configuration step of a low power set comprising at least one access point able to transmit at low power on said at least one low power channel, the configuration step comprising the sending of an element of configuration information to the at least one access point.

According to another aspect, the invention relates to a device implementing the configuration method of the network. The invention relates to a first access point of a network. The device comprises a module adapted to store an element of information representative of a reserved frequency space comprising at least one low power channel, and a configuration module adapted to send an element of configuration information to at least one access point being able to transmit at low power on said at least one low power channel.

4. LIST OF FIGURES

Figure 2:
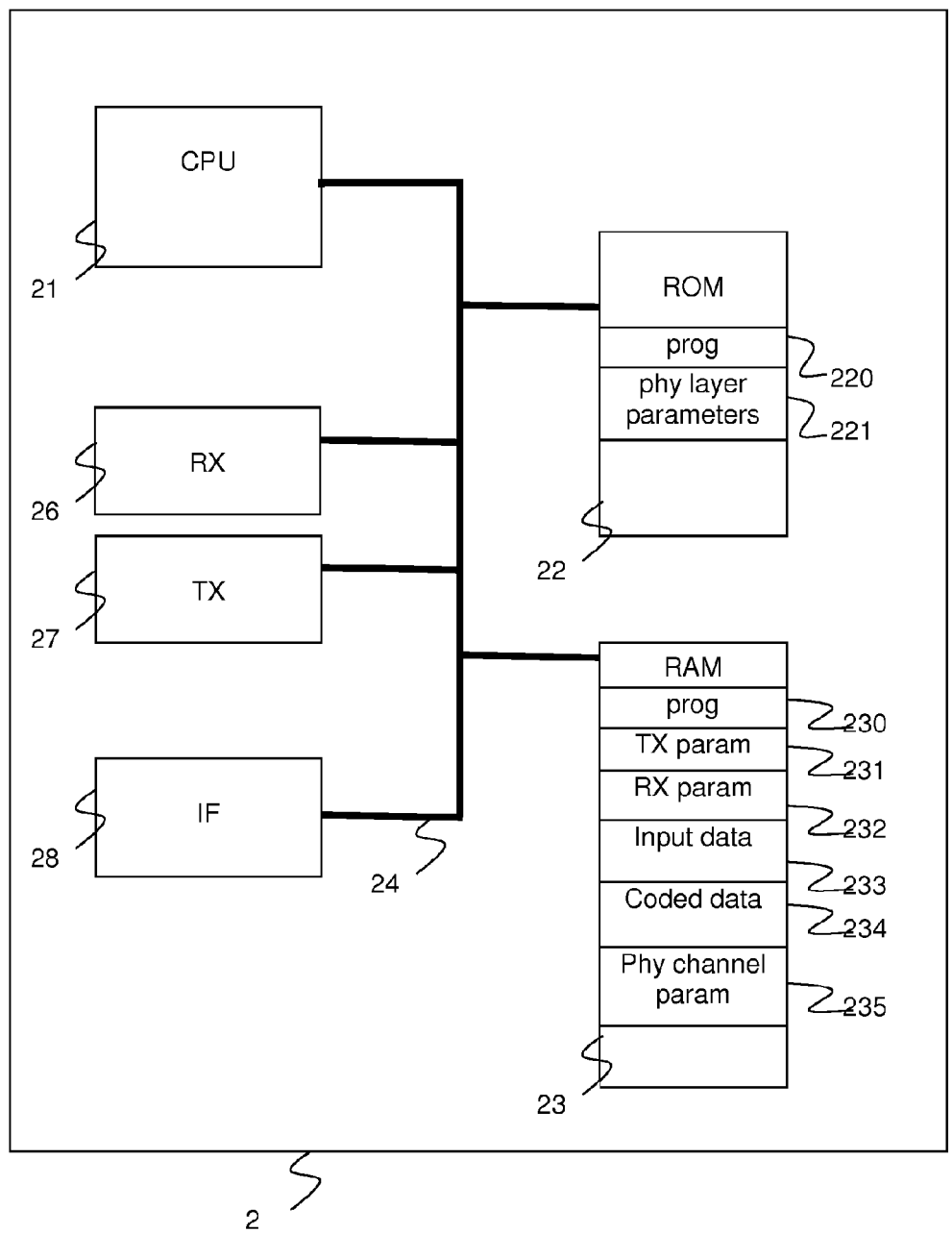
Figure 3:
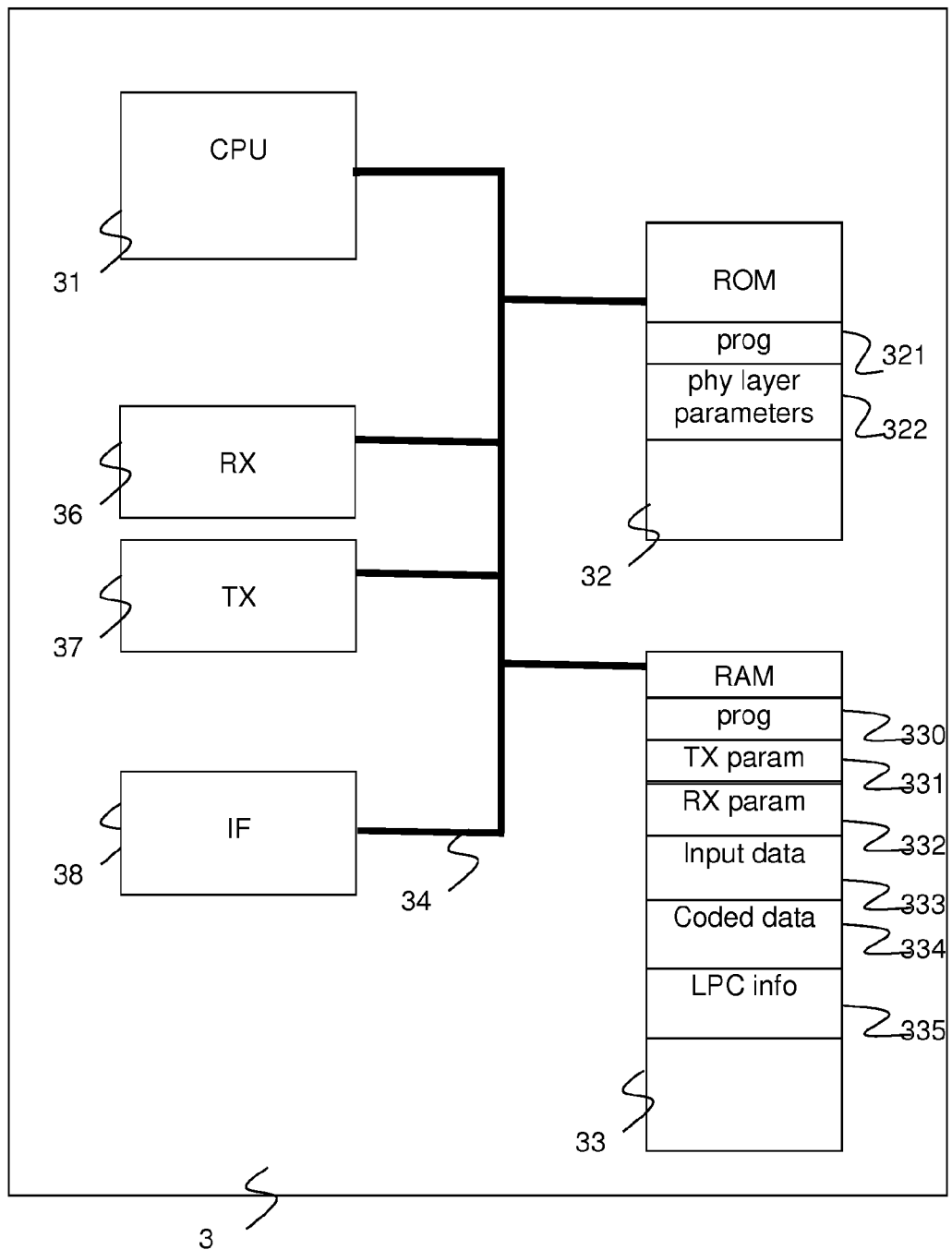
Figure 4:
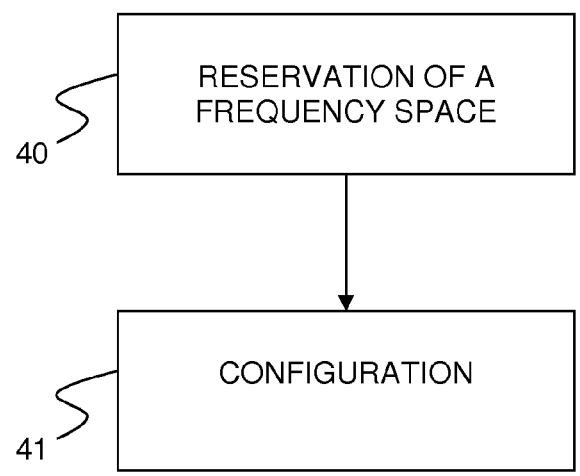
Figure 5:
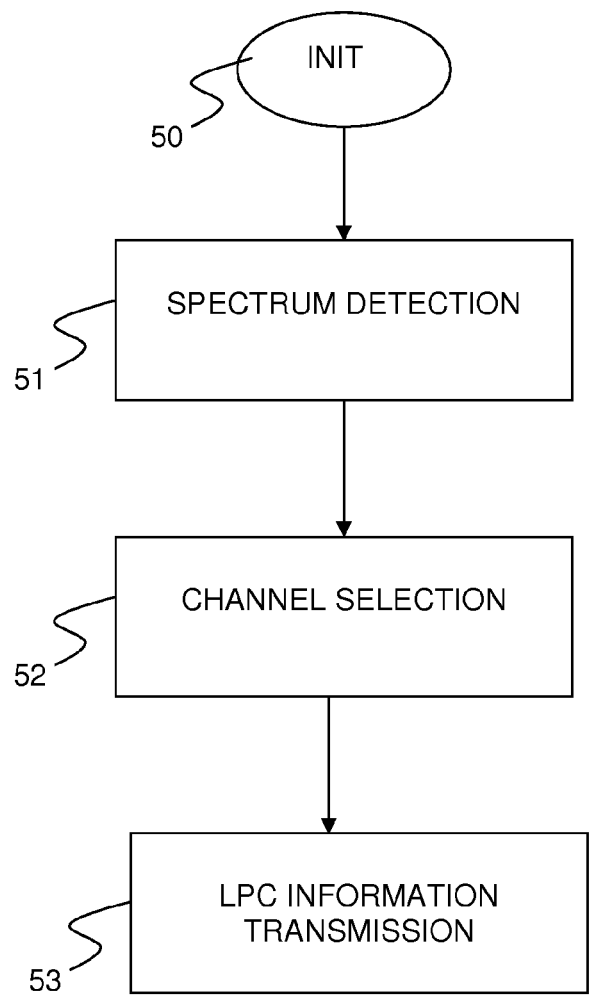
Figure 6:
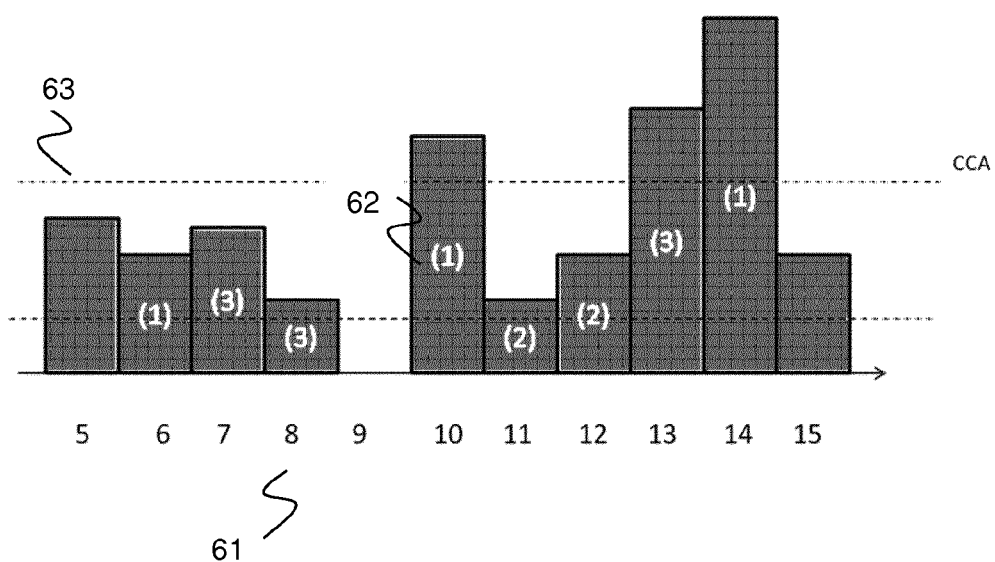

The invention will be better understood, and other specific features and advantages will emerge upon reading the following description, the description making reference to the annexed drawings wherein:

FIG. 1 shows a wireless system implementing a wireless network, according to a particular embodiment of the invention, FIGS. 2 and 3 diagrammatically show respectively an access point and a client of a network of the system of FIG. 1, according to a particular embodiment of the invention, FIGS. 4 and 5 show a configuration method of a wireless network of the system of FIG. 1, according to particular embodiments of the invention, FIG. 6 shows a spectrum example of the frequency channels after the detection step according to a particular embodiment of the invention.

5. DETAILED DESCRIPTION OF EMBODIMENTS OF THE INVENTION

FIG. 1 shows a wireless communications system implementing a wireless network 100. The network 100 comprises three access points LPC_AP A, LPC_AP B and AP C. The access point LPC_AP A covers by means of an antenna a space corresponding to the circular area 120A. The access point LPC_AP B covers by means of an antenna a space corresponding to the circular zone 120B. Finally, the access point AP C covers by means of an antenna a space corresponding to the circular zone 120C. The network 100 further comprises a client or several STA clients connecting to one of the access points of the network via a wireless link. The network thus described advantageously forms a Wi-Fi® network and uses one or more channel frequencies belonging to the 5 GHz frequency band.

According to a variant, the access points LPC_AP A, LPC_AP B and AP C are of the SISO ('Single Input Single Output') type and only have a single antenna. Likewise, all of the STA clients are of the SISO type.

According to another variant, all the access points LPC_AP A, LPC_AP B and AP C are of the MIMO type and have several antennas transmitting a MIMO signal. Likewise, all of the STA clients 130 are of the MIMO type.

According to another variant, some access points LPC_AP A, LPC_AP B and AP C (respectively some STA clients) of the system are of the MIMO type and the others are of the SISO type.

According to an advantageous characteristic of the invention, a low power frequency space is reserved for the access points belonging to a low power set, that is whose power on emission of the signals carrying the wireless communications is limited in particular on this reserved space. Hence, the power of the signals transmitted by an access point belonging to a low power set is less than a first threshold. Consequently, the power of the signals transmitted by this access point and received by a neighbouring access point is less than a second threshold. Indeed, one way for two wireless access points LPC_AP A and LPC_AP B transmitting on the same frequency band not to interfere is to reduce their emission power thus limiting their coverage zone. However, if an access point LPC_AP A decided unilaterally to reduce its emission power, this access point alone would support the disturbances or interferences of the other access points LPC_AP B and AP C. One idea of the invention is thus to define a low power policy common to the access points such that collectively these access points limit their emission power. Hence, a plurality of frequency bands, called low power channels noted LPC in the rest of the description, are reserved for the communications of the access points applying the limitation policy of the power. The access points LPC_AP A and LPC_AP B applying the low power policy are called low power channel access point noted LPC_AP. According to a first embodiment, a low power channel at 5 GHz has a reception power level less than a second threshold for example fixed between 0 dBm and 5 dBm, whereas a normal power channel (or, by opposition, a high power channel) has a power level greater than this second threshold. According to an advantageous variant a normal power channel (or, by opposition, a high power channel) has a high power level greater than a third threshold, generally between 20 dBm and 25 dBm. According to a second embodiment, a low power channel at 5 GHz is at a power level of approximately 20 dB below the normal power.

The different configurations described below illustrate cases of interferences generated by the reception power level of the neighbouring access points of an access point. Each access point sends a signal comprising information representative of an identifier (BSSID from Basic Service Set IDentifier) of the access point transmitting the signal. This signal is called a beacon frame. A beacon frame also comprises information representative of its characteristics and is membership with a network, the network also being represented by an identifier. The clients or access points, receiving a signal transmitted by a neighbouring access point advantageously estimate the RSSI (Received Signal Strength Indicator) of the signal received and decode the signal to extract from it the identifier of the neighbouring access point transmitting the signal. The RSSI can define interference levels between the different access points.

In a first configuration point, the access points LPC_AP A and LPC_AP B are located so close to one another that a signal transmitted from the neighbouring access point LPC_AP A, on the same channel on which LPC_AP B sends, is received with an RSSI level above a second threshold (reception power threshold), for example the CCA threshold (Clear Channel Assessment), by the access point LPC_AP B. The access points LPC_AP A and LPC_AP B are constrained to share the frequency resource over time by reserving for example temporal spaces. The CCA threshold is typically −82 dBm in 20 MHz channels.

In a second configuration, the access points LPC_AP A and LPC_AP B are located close enough so that signal transmitted from the neighbouring access point LPC_AP A is received with an RSSI level above the CCA level but still below the detection level of the beacon. This beacon is, indeed, transmitted by using a robust modulation mode, and the level of detection associated with the beacon frame is typically −100 dBm. In this case, the transmission can be done simultaneously by the two wireless access points on the same channel without significant deterioration.

In a third configuration, the access points LPC_AP A and LPC_AP B are located fairly distant from each other such that they only contribute by increasing the noise level of the other. The impact is only significant if a large number of channels at the same frequency interfere with each other. The impact is limited for 5 GHz networks comprising 19 frequency channels.

In a fourth configuration, some access points do not apply the power limitation policy for many reasons: these access points are not adapted, these access points cannot reach the distant clients without transmitting with high power. According to this shown configuration FIG. 1, the access points LPC_AP A and LPC_AP B apply the low power policy, these access points are called collaborative. The access point AP C does not apply the limitation policy, AP C is called non-collaborative. If it occupies the same channel as LPC_AP A and LPC_AP B, the non-collaborative access point AP C thus disturbs the communications of the collaborative access points LPC_AP A and LPC_AP B. However, as it will be seen in the rest of the description, according to a particular embodiment, the collaborative access points if they occupy, in number, an LPC channel, will lead a non-collaborative access point to use a different channel from the one used by the collaborative access points.

According to another configuration, the configuration of the access points LPC_AP A, LPC_AP B, AP C and STA clients in the space are a combination of at least two of the previously described configurations. Finally, according to another configuration, other types of signals disturb the wireless communications such as for example the radar signals which, during their transmission, do not take into account the existence of wireless communications.

According to a particularly advantageous embodiment of the invention, the LPC_AP A and LPC_AP B access points transmit a beacon frame signal with a higher power than for the other signals. This embodiment leads to a fifth configuration particularly well adapted to the implementation of a low power policy. This embodiment uses the characteristic according to which the beacon frame signals advantageously use a robust modulation mode adapted to an optimum configuration of the power amplifier enabling a higher power level to be synthesised for the beacon frames. Hence, for a same access point, the coverage zone of the beacon frame is more extended than the coverage zone of a communication signal. In practice, the emission power level of the beacon frame reaches 10 dBm according to a variant of this embodiment. Advantageously, this level exceeds 20 dBm or even 25 dBm according to other variants so as to widen the reception zone of the beacon frame. In this embodiment, the respective beacon frames of the two access points LPC_AP A and LPC_AP B are received at a higher power level than their respective CCA threshold, whereas the communications of the access points with their respective clients are received at a lower power level than their respective CCA threshold. The access points thus advantageously do not have to support the interference of each other in their communications with clients located in their coverage zone. Furthermore, given that the beacon frames have a limited duration, the interferences possibly generated by beacon frames of an access point will be negligible with respect to communications from other access points. Finally, this embodiment is particularly well adapted to the implementation of a low power policy as it can combine a coverage zone for the reduced communications and a detection zone of neighbours in the wide network. Indeed, in this embodiment, a limited transmission power for the communications, that is less than the first threshold, is compatible with a more extended coverage zone of the access point for the beacon frames. A low power access point will therefore have the information that its neighbour or neighbours are also LPC, that they transmit on the same channel as it, that they will not disturb its communications and that by sending on the same channel as its neighbours it increases the LPC community.

Hence, FIG. 1 can also illustrate an advantage of the invention according to which a multiple occupation of a channel by different collaborative access points LPC_AP A and LPC_AP B can prevent the presence on this channel of a non-collaborative access point AP C. If LPC_AP A and LPC_AP B use the same channel, they are not disturbed by mutual interference as the power level of the beacon frame signal of LPC_AP A received by LPC_AP B is below the CCA threshold of LPC_AP B and reciprocally. This occupation of the same channel will lead to a non-collaborative access point AP C, seeking to use a channel frequency, to select a channel frequency separate from the one shared by LPC_AP A and LPC_AP B as this channel frequency will be occupied in a multiple manner.

According to an advantageous variant the access points, for example linked to access gateways of a communications network, are controlled by an access operator to the network. This variant has the advantage of being able to define a limitation policy of the common power and centralised in all the access points at the level of the operator. Several operators can also commit together. According to another variant, the access points are located in electronic devices complying with for example the Wi-Fi direct® policy. In this variant, the definition of a common policy of power limitation is possible at the level of the manufacturers of the devices. Most of access points are wireless routers, meaning converged devices that include the AP, a router, and, often, an Ethernet switch. Many also include a gateway or broadband modem. Access point may also being implemented in a personal computer (PCs).

According to a particular characteristic, the power received from neighbouring access points on a low power channel is defined by the power of any signal received by the access point, whether this signal transports a beacon frame or communication data to a client. This means that the maximum of the RSSI of the signals received on this channel is less than a threshold, for example the CCA threshold.

According to another particular characteristic, the power received from the neighbouring access points on a low power channel is defined by the average power of any signal received by the access point. This means that the sum of the RSSI of the signals received on this channel related to the activity time of the signals is less than a threshold, for example the CCA threshold.

According to another particular characteristic, the power received from neighbouring access points on a low power channel is defined by the power of any signal received by the access point transporting communication data to a client. According to this characteristic, the reception power of an access point on a low power channel does not take into account signals relative to beacon frames. This characteristic is particularly well adapted in the embodiment according to which the power level of the signals transporting beacon frames is greater than the one of signals transporting communication data. This is seen in a maximum of the RSSI of the signals received carrying on this channel communication data to the clients at a threshold, for example the CCA threshold.

FIG. 2 diagrammatically shows a hardware embodiment of an access point 2 corresponding for example to the access points LPC_AP A or LPC_AP B of FIG. 1.

The access point 2 comprises the following elements, connected to each other by a bus 24 of addresses and data that also transports a clock signal:
  a microprocessor 21 (or CPU (Central Processing Unit)),
  a non-volatile memory of the ROM ("Read Only Memory") type 22,
  a random access memory or RAM 23;
  a radio interface 26,
  an interface 27 adapted for the transmission of data (for example broadcasting of services or point to multipoint or point to point transmission) and performing notably the functions of a coder and/or OFDM modulators,
  a MIMI (Man Machine Interface) interface 28 or a specific application adapted for the display of information for a user and/or the input of data or parameters (for example, the parameterization of sub-carriers and data to be transmitted).

It is noted that the word "register" used in the description of the memories 22 and 23 designates, in each of the memories mentioned, a memory zone of low capacity (some binary data) as well as a memory zone of large capacity (enabling a whole programme to be stored or all or part of the data representative of data received or to be broadcast).

The memory ROM 22 comprises in particular:
  a 'prog' 220 program, and
  parameters 221 of physical layers.

The algorithms implementing the steps of the method specific to the invention and described below are stored in the ROM 22 memory associated with the access point 2 implementing these steps. When powered up, the microprocessor 21 loads and runs the instructions of these algorithms.

The random access memory 23 comprises in particular:
  in a register 230, the operating programme of the microprocessor 21 responsible for switching on the access point 2
  transmission parameters 231 (for example, modulation, coding, MIMO, frame recurrence parameters),
  reception parameters 232 (for example, modulation, coding, MIMO, frame recurrence parameters),
  incoming data 233,
  coded data 234 for transmission of data, and
  physical channel parameters 235 (for example application of a low power policy, frequency band of the LPC reserved channels allocation of a determined frequency band, of a determined frequency bandwidth, of determined time slots, of a determined code and/or sub-carrier intervals determined at the transmission of data by the access point 2).

The radio interface 26 is adapted for the reception of signals if necessary by one or more clients or access points shown in FIG. 1. The interface 27 is a transmitter, adapted for the transmission of signals, particularly an element of information representative of the membership of the LPC set, if necessary to one or more clients or access points shown in FIG. 1

FIG. 3 diagrammatically shows a hardware embodiment of a client 3 corresponding for example to the STA client of FIG. 1. STA clients may include any type of electronic devices that are able to connect to WI-FI network such as mobiles phones, smartphones, PCs, tablets, cameras, or printing device. Most of these devices are portable devices. The client 3 comprises the following elements, connected together by an address and data bus 34 which also transports a clock signal:
  a microprocessor 31 (or CPU (Central Processing Unit)),
  a non-volatile memory of the ROM ("Read Only Memory") type 32,
  a random access memory or RAM 33;
  a radio interface 36,
  an interface 37 adapted for the transmission of data (for example broadcasting of services or point to multipoint or point to point transmission) and performing notably the functions of a coder,
  an MMI (Man Machine Interface) 38 or a specific application adapted for the display of information for a user and/or input of data or parameters.

It is noted that the word "register" used in the description of the memories 32 and 33 designates, in each of the memories mentioned, a memory zone of low capacity (some binary data) as well as a memory zone of large capacity (enabling a whole programme to be stored or all or part of the data representative of data received or to be broadcast).

The memory ROM 32 comprises in particular:
  a 'prog' 320 program, and
  parameters 321 of physical layers.

The algorithms implementing the steps of the method specific to the invention and described below are stored in the ROM 32 memory associated with the client 3 implementing these steps. When powered up, the microprocessor 31 loads and runs the instructions of these algorithms.

The random access memory 33 comprises in particular:
  in a register 330, the operating program of the microprocessor 31 responsible for switching on the client 3,
  transmission parameters 331 (for example, modulation, coding, MIMO, frame recurrence parameters),
  reception parameters 332 (for example, modulation, coding, MIMO, frame recurrence parameters),
  incoming data 333,
  coded data 334 for transmission of data,
  parameters 335 representative of the application of the low power policy (for example the level of the transmission power on a low power channel).

The radio interface 36 is adapted for the reception of signals if necessary by one or more other access points AP or LPC_AP of the network 100 of FIG. 1.

FIG. 4 shows a method for configuration of a wireless network 100 of FIG. 1, according to a particularly advantageous non-restrictive embodiment of the invention.

During a step 40 for reserving a frequency space, the different operators and/or constructors define a frequency space reserved for the access points applying the limitation policy of the power. This space comprises a set of generally contiguous channels, whose frequency band possibly depends on the country in which the local wireless network is deployed and on the wireless communication standard. A channel is defined as a low power channel for all the collaborative access points, that is for the access points that have decided to apply a joint allocation policy of frequency and power. However, a low power channel for a collaborative access point will be any channel for a non-collaborative access point. Advantageously, an access point, although not transmitting on a low power channel, is collaborative. Indeed, an access point according to a particular configuration, (for example all the channels are occupied by a reception power access point) can not transmit on an LPC channel while complying with the low power policy (it transmits on a non-reserved channel so as not to disturb the others): this point of access is collaborative. During this step, it is necessary to determine the parameters of this space among which can be cited the number of low power channels, the occupied frequency band in the spectrum. According to a first embodiment, the number of low power channels is high (that is greater than a first defined threshold), for example greater than 10. This embodiment has the advantage of limiting the interferences in the house, that is in the space close to the different access points. This embodiment is also particularly well adapted when the number of access points applying the low power policy is high. For example, a single LPC channel will not be enough to hold 20 low power access points in a close space such as a building According to a second embodiment, the number of low power channels is low (that is less than a second defined threshold), for example limited to 2. This embodiment has the advantage of reducing the probability of being disturbed by a non-collaborative access point as this probability increases with the width of the spectrum occupied by the low power access points. For example, if among the 20 access points mentioned above, 16 access points are collaborative and occupy 16 separate LPC channels, it is probable that some of them will have to bear the presence of non-collaborative access points in their transmission channel as the 4 non-collaborative access points will not have a sufficient number of separate channels to transmit without interfering and will place themselves on some LPC channels. According to an advantageous embodiment, the number of reserved channels will depend on the ratio number of collaborative access points over number of non-collaborative access points that is the higher the ratio the higher the number of LPC channels will be. Finally, relative to the parameter of the frequency band occupied in the spectrum, there is no determined place in the spectrum that is a priori to be given priority with respect to others.

Next, then during a configuration step 41 of a low power set, the access points defined as collaborative and transmitting on the low power channels by complying with the power limitation are configured. During this configuration step, one or more parameters of at least one low power access point of the network, for example a Wi-Fi network using the 5 GHz band of frequencies, is configured. The parameters to configure can inform the access point on its membership with the low power set i.e. its collaborative character, on the reservation of the frequency space for the collaborative access points and on the channel allocation method. The parameters to be configured belong to a group comprising:

a parameter representative of the collaborative (LPC) or non-collaborative character of the access point, a physical layer parameter, that is for example a transmission channel frequency, a transmission power, the different threshold levels of the LPC configuration method.

According to a variant, the group of parameters only comprises a single or two of the parameters listed above. According to another variant, the first parameter to be configured is a combination of at least two parameters of the group of parameters defined above, for example a combination associating a parameter representative of the LPC character with a physical layer parameter.

FIG. 5 shows a channel allocation method according to a non-restrictive particularly advantageous embodiment of the invention in a low power access point.

During an initialization step 50, the various parameters of the access point are configured. In particular, the parameters corresponding to the information of the LPC character of the access point, to the power level of the signals to transmit, if necessary to the low power channels, are initialised in any manner. According to a variant, the initialisation step follows the reception of configuration messages transmitted by a server of a wireless communication system, or even by commands from an operator. This variant has the advantage of being able to configure or update an existing configuration for a set of access points already deployed. In another variant, this step is realised during the manufacture of the electronic devices integrating an access point.

Next, during a channel allocation step, each access point determines, according notably to configured parameters but also to the occupation of the spectrum, a channel on which the access point can transmit.

Hence, during a sub-step 51 of the channel allocation step, the access point detects the signals received on the frequencies of its reception band, notably the beacon frames transmitted by the possible other access points present in the network. Advantageously, the access point estimates the reception power of the different beacon frame signals transmitted by the neighbouring access points on these channels. According to a variant, the access point adjusts the reception power level according to an element of information of the transmission level of the beacon frame signals of the neighbouring access points. According to another variant, the access point estimates the reception power of the different signals transmitted by the neighbouring access points on these channels. According to another variant, the access point receives an element of information representative of the reception power of the different signals transmitted by the neighbouring access points on these channels. The access point thus establishes the spectrum of the channels used, the list of collaborative and non-collaborative access points present, the list of the low power channels used and the reception powers of the different neighbouring access points on these channels as shown in FIG. 6.

Next, during a sub-step 52 of the channel allocation step, a low power access point selects a channel to transmit from among the reserved channels.

According to a first variant, if no LPC channel is used, the LPC access point selects a channel from among the LPC channels randomly.

According to a second variant, from among the LPC channels that are not occupied by an access point with a high reception power level, the LPC access point selects the LPC channel on which the greatest number of LPC access points transmit. An access point at a high reception power level is, for example, either by a non-collaborative access point, or by a neighbouring collaborative access point located in a very close space, and whose power received by the LPC access point looking to select a channel, is greater than a threshold, for example the CCA threshold. Advantageously, a maximum number of LPC access points per channel is determined. The LPC access point selects the channel from the LPC channels on which the greatest number of LPC access points are transmitting, this number of LPC access points being less than the maximum number determined. If the maximum number determined is reached, the LPC access point selects another LPC channel in decreasing order of the number of LPC access points present on this channel, this number must be less than the maximum number determined, In case of equality of the number of LPC access points present on 2 separate channels, the LPC access point advantageously selects the LPC channel with the average power of the signals on this weakest channel.

According to a third variant, if all the LPC channels are occupied by an access point with a high reception power level, the LPC access point advantageously selects a channel that is not LPC, i.e. outside the reserved frequency space. For this, the access point selects a channel according to a method known by those skilled in the art.

Finally, during an information transmission step 53, the access point that selected a channel transmits a basic element of information representative of its membership to a limitation policy of the power. According to a preferred embodiment, the access point transmits a beacon frame signal comprising this basic element of information. The beacon frame is advantageously compliant with the standard IEEE 802.11-2007 or IEEE 802.11-2012. The implementation of the transmission of the LPC information of an access point is realised via an information element (noted IE) available in the standard. This element, transmitted by the beacon frame, advantageously enables a collaborative access point to provide the neighbouring access point and the clients in its coverage zone with information on its membership of the set of collaborative access points in terms of limitation of the power. Hence, the set of collaborative access points will recognise each other.

According to refinements of the embodiment, a collaborative access point can change channel, that is reiterate the allocation step, if a non-collaborative access point or a source of interference (such as a radar source) emerges on this channel. Moreover, a collaborative access point can go from the low power collaborative mode to the non-collaborative mode dynamically so as to adapt its transmission channel and its power level to its environment. This embodiment is well adapted to the example where one of the STA clients of the collaborative access point is mobile and moves away from the zone covered with a limited power. In this case, the access point consequently modifies the information of the beacon frame.

FIG. 6 shows an example of detected spectrum according to a particular embodiment. The different channels 61 of the spectrum, numbered from 5 to 15, are shown. For each channel, the number 62 of neighbouring access points detected by an access point during the frequency allocation step is also shown. The channels numbered 6-14 belong to the reserved frequency space comprising the LPC channels. Hence, out of the 9 LPC channels available, 6 LPC channels only, (that is the channels 6 to 9, 11 and 12) receive on these frequencies communications with a power level below the CCA threshold 63. Out of these 6 remaining LPC channels, only 5 are actually occupied by a collaborative access point. According to a variant of the allocation step previously described, the one of LPC channels 7 or 8 will be selected by an access point during the IPC channel allocation step as these LPC channels comprise the greatest number 62 of access points (that is 3). It is further assumed that the number 3 is below the maximum number determined of LPC access points per LPC channel. According to another variant of the allocation step, an LPC access point advantageously selects an LPC channel from the channel 7 and the channel 8 on RSSI average power criteria.

Naturally, the invention is not limited to the embodiments previously described.

In particular, the invention is not limited to the network comprising two collaborative access points as shown in FIG. 1. In particular, the invention is well adapted to unlicensed band communications. The network is not limited to a Wi-Fi® network using a 5 GHz frequency band but extends to any WLAN type wireless network, such as for example HiperLAN2 or Femtocell using LTE (Long Term Evolution) or using HSDPA (High Speed Downlink Packet Access). In the same way, the network extends to any wireless network of type WLAN or WPAN (Wireless Personal Area Network), such as for example a W-Fi network using the 2.4 GHz frequency band (standards IEEE 802.11b or IEEE 802.11g), a Bluetooth type network (standard IEEE 802.15.1), WiMax (standard IEEE 802.16), RAN (Regional Access Network, standard IEEE 802.22) or a ETSI HiperPAN network. The invention is not limited to a type of network but extends to any set of coexisting networks and that can extend in such a manner to cooperate with regard to joint configuration of frequency and power.

In particular, the invention is not limited either to the frequency allocation step described. Any existing allocation procedure is compatible with the invention as soon as the transmission power of an LPC access point on this LPC channel meets the limitation criteria of the power.

The invention claimed is:

1. Method for operating a first access point of a network, implemented in said access point, the method comprising:
   configuration of said first access point as belonging to a low power set and able to transmit at a power level lower than a first power level on at least one low power channel;
   transmission of an indication that said access point belongs to said low power set;
   selection of a low power channel for transmission among at least one low power channel on which the reception power of a signal transmitted by the neighbouring access points is less than a second power level.

2. The method according to claim 1, wherein during the selection of a low power channel, no low power channel is selected when the reception power of a signal transmitted by the neighbouring access points on each of said at least one low power channel is greater than said second power level.

3. The method according to claim 1, wherein during the selection of a low power channel, a low power channel is further selected among said at least one low power channel on which the number of neighbouring access points is the greatest.

4. The method according to claim 1, wherein during the selection of a low power channel, a low power channel is further selected among said at least one low power channel on which the number of neighbouring access points is lower than a value.

5. The method according to claim 4, wherein during the selection of a low power channel, no low power channel is selected when the number of neighbouring access points on each of said at least one low power channel is greater than said value.

6. The method according to claim 1, wherein during the selection low power channel, a low power channel is further selected from said at least one low power channel on which the reception power of a signal transmitted by the neighbouring access points is the lowest.

7. The method according to to claim 1, wherein said reception power of a signal transmitted by the neighbouring access points on a channel is chosen from at least one of:
- the reception power by said first access point of any signal transmitted by each of said neighbouring access points on said channel;
- the average reception power by said first access point of signals transmitted by each of said neighbouring access points on said channel over a determined period;
- the reception power by said first access point of any signal transmitted by each of said neighbouring access points on said channel with the exception of signals comprising the beacon frames of each of the neighbouring access points.

8. The method according to claim 1, wherein the transmission by said first access point of said indication that said first access point belongs to said low power set, comprises the transmission of beacon frames, said beacon frames comprising said indication.

9. The method according to claim 8, wherein said beacon frames are transmitted at a greater power level than said first power level.

10. A method for a network implemented in the at least one configuration device comprising:
- reservation of a frequency space comprising at least one low power channel;
- a configuration of a low power set comprising at least one access point able to transmit at a power lever lower than a first power level on said at least one low power channel, said at least one access point comprising a transmission of an indication that said access point belongs to said low power set, said configuration comprising the sending of an indication of configuration to the at least one access point;
- wherein the at least one access point belonging to said low power set is configured to select a low power channel for transmission, among at least one low power channel on which the reception power of a signal transmitted by the neighbouring access points is less than a second power level.

11. An access point, comprising:
a processor configured to:
- configure said access point to transmit at a power level lower than a first power level, on at least one low power channel;
- select a low power channel for transmission, among at least one low power channel on which the reception power of a signal transmitted by the neighbouring access points is less than a second power level; and
a transmitter for transmitting on the low power channel.

12. The access point according to claim 11, wherein the processor is further configured to not select any low power channel when the reception power of a signal transmitted by the neighbouring access points on each of said at least one low power channel is greater than said second power level.

13. The access point according to claim 11, wherein the processor is further configured to select a low power channel among said at least one low power channel on which the number of neighbouring access points is the greatest.

14. The access point according to claim 11, wherein the processor is further configured to select a low power channel among said at least one low power channel on which the number of neighbouring access points is lower than a value.

15. The access point according to claim 14, wherein the processor is further configured to not select any low power channel when the number of neighbouring access points on each of said at least one low power channel is greater than said value.

16. The access point according to claim 11, wherein the processor is further configured to select a low power channel from said at least one low power channel on which the reception power of a signal transmitted by the neighbouring access points is the lowest.

17. The access point according to claim 11, wherein the processor is further configured to choose said reception power of a signal transmitted by the neighbouring access points on a channel from at least one of:
- the reception power by said first access point of any signal transmitted by each of said neighbouring access points on said channel;
- the average reception power by said first access point of signals transmitted by each of said neighbouring access points on said channel over a determined period;
- the reception power by said first access point of any signal transmitted by each of said neighbouring access points on said channel with the exception of signals comprising the beacon frames of each of the neighbouring access points.

18. The access point according to claim 11, wherein the transmission by an first access point of an indication that said first access point belongs to a low power set, comprises the transmission of beacon frames, said beacon frames comprising said indication.

19. The access point according to claim 18, wherein said beacon frames are transmitted at a greater power level than said first power level.

* * * * *